May 29, 1945.   H. H. WALLEY, JR   2,377,196
SWIVEL JOINT FOR FLUID CONDUITS
Filed Jan. 6, 1943
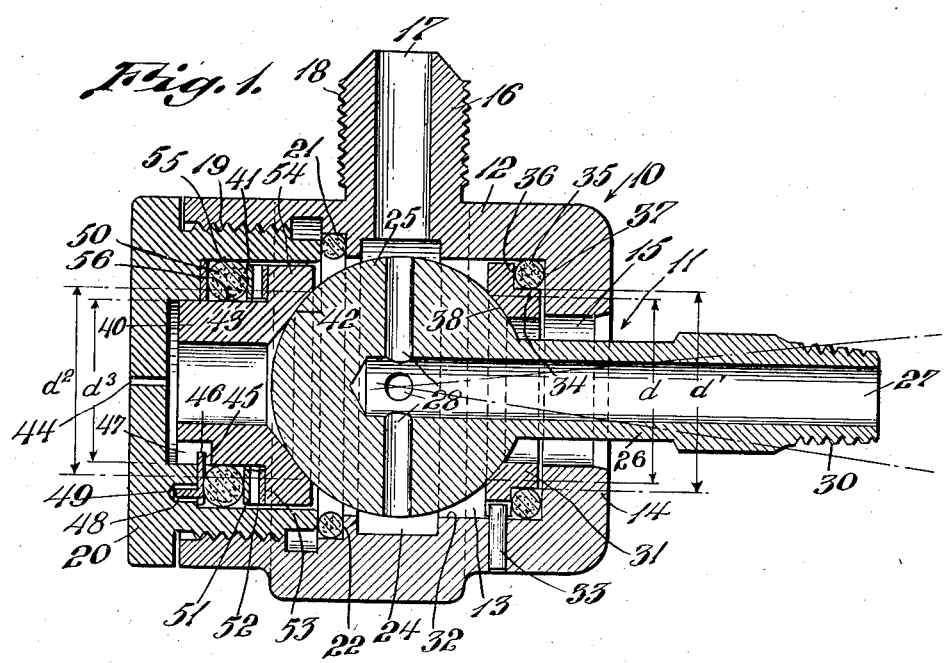
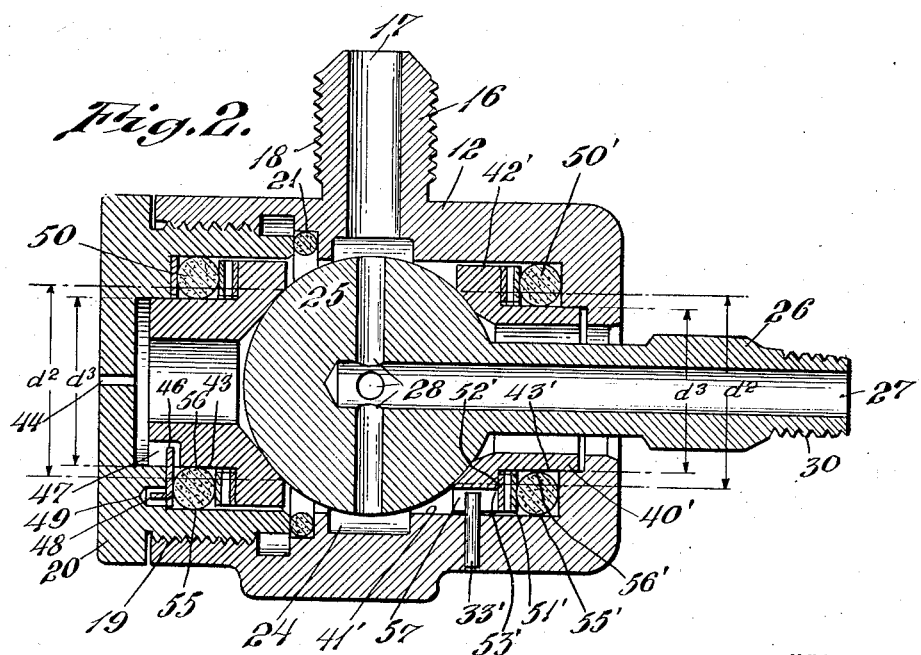
INVENTOR
*Herbert H. Walley Jr.*
BY *Barlow & Barlow*
ATTORNEYS Patented May 29, 1945

2,377,196

UNITED STATES PATENT OFFICE 2,377,196

SWIVEL JOINT FOR FLUID CONDUITS

Herbert H. Walley, Jr., Newton, Mass., assignor to Stevenson Engineering Corporation, a corporation of Rhode Island Application January 6, 1943, Serial No. 471,434

5 Claims. (Cl. 285—95)

This invention relates to a swivel joint for the conduit of a high pressure fluid system wherein the conduit may be connected to apparatus which may rotate through any part of 360 degrees or more in either direction and also be permitted of some rocking motion.

In joints of this character heretofore where high pressures were conducted through the swivel joints it was necessary to make these swivel joints so tight to prevent the escape of the fluid conducted that movement of the swivel joint was had with great difficulty. When the joints were made sufficiently tight so that leakage would not occur scoring of the joints was likely to happen and a high degree of wear existed causing replacements to become necessary frequently. Further, in swivel joints of this character leakage was apt to occur especially after there had been some use or manipulation of the joint for a short period of time.

One of the objects of this invention is to provide a tight swivel joint for a high pressure fluid system in which the parts may swivel one upon the other with comparative ease and to utilize the fluid which is conducted for applying its own pressure to cause a seal.

Another object of this invention is to so arrange the parts that the fluid will press upon the part that forms the seal with a predetermined pressure ratio to the pressure of the fluid conducted supplying by reason of the construction just sufficient pressure to cause a seal.

With these and other objects in view, the invention consists of certain novel features of construction, as will be more fully described and particularly pointed out in the appended claims.

In the accompanying drawing:

Fig. 1 is a sectional view illustrating a swivel joint constructed in accordance with this invention;

Fig. 2 is a view similar to Fig. 1 illustrating a modified form of joint by the duplication of the balance seal on either side of the entrance conduit into the body portion thereof.

In the swivel joint which I provide for a fluid conduit, one part has a spherical end which may be enclosed within the other part for rotation in one plane through all or any part of 360 degrees while it may be rocked in other planes at right angles to such a plane to a lesser amount while at all times providing an unrestricted flow through them. A seal is provided at the joint of the parts which seal is carried by the body and maintains only a slidable relation therewith for the application of the sealing contact to the rotating part itself and in order that the pressure on the sealing surface may be proportional to the pressure of the fluid conducted I have caused this fluid to envelope the member which carries one of these sealing surfaces and so shaped this member as to its diameter relative to the diameter of the sealing surface which it carries that the diameter of a surface exposed to the fluid will provide the desired differential to cause the fluid to press upon and urge the member carrying this sealing surface toward sealing position.

With reference to the drawing 10 designates generally the body part and 11 designates relatively rockable part which is swivelly mounted with reference to the body part.

The body part is represented in the form of a casting having a generally cylindrical wall 12 enclosing a hollow chamber 13 with an integral end wall 14 provided with an exit opening 15. At the opposite end of the cylindrical body 12 internal threads are provided for the reception of a closure cap 20 which is threaded into the cylindrical wall 12 and engages an annular packing ring 21 against an abutment 22 for forming a fluid tight fit and closing the hollow body. A boss 16 extends radially from the cylindrical wall 12 and is provided with an entrance port 17 and is threaded externally as at 18 for the connection of some suitable coupling to connect a conduit thereto. An annular recess 24 is provided in the inner surface of the cylindrical wall 12 to which the inlet conduit 17 extends.

The rockable part 11 has a finished spherical end 25 located within the body 10 with a neck 26 extending from this spherical portion outwardly through the exit opening 15 in the wall 14. This neck portion 26 is provided with a bore 27 while cross bores 28 extend diametrically through the sphere 25 in a plane at right angles to the bore 27 and connect with this bore 27 to provide a communicating conduit from the interior of the body outwardly therefrom. These bores 28 and the conduit 17 connect with the annular recess 24 in the body so that there will always be an annular reservoir of the fluid admitted through the conduit 17 about this rockable part 11 for the delivery of the fluid to bores 28 and outwardly through bore 27. Suitable threads 30 on the end of the neck 26 provide for a connection of this neck to some suitable pipe by a coupling arrangement.

A tight joint is provided by engagement with the sphere 25 for sealing the fluid from escape from either side of the annular recess 24 consisting of an annular member 31 which will slidably fit the inner cylindrical surface 32 and will be keyed by pin 33 to prevent relative rotation of this member 31 with reference to the body. This member is reduced in diameter as at 34 to provide a space for an annular soft packing 35 which will be compressed sufficiently to provide seals as at 36 and 37 where it engages the member and the wall 14 to prevent fluid from escaping from the hollow chamber 13 within the body. A suitable curved finished sealing surface 38 is provided on the member 31 to fit the sphere and engage therewith sufficiently closely as to provide a seal.

The diameter of the portion 34 which receives the packing 35 will be greater than the greatest diameter of the sealing surface 38 of the member 31. I have represented the diameter of the sealing surface by the dimension $d$ while the diameter of the portion 34 is designated $d'$. Thus the differential $d'$ minus $d$ will represent the area which will be effectively pressed upon by the fluid pressure to move the member 31 toward the right as shown in Fig. 1 and cause pressure on the soft packing that a seal may occur at 36 and 37 against the escape of fluid.

On the other side of the annulus 24 the seal is provided by a member 40 which may be cup shape with an axial hole or annular shape as here shown axially movably related to the cylindrical surface 41 of the cap 20. A finished sealing surface 42 is presented by the member 40 to engage the spherical portion 25 of the rockable part which surface has its largest diameter designated $d^2$ at the outer edge thereof. This member 40 is reduced in diameter as at 43 which diameter is represented by the dimension $d^3$ so that the fluid which embraces the member 40 and extends around the opposite side of the member 40 will press upon the surface provided by this reduced diameter. The differential $d^2-d^3$ will represent the area which will be effectively pressed upon by the pressure of the enveloping fluid. The member 40 is prevented from rotation relatively to the body by a washer 45 having a finger 46 extending into a recess 47 in the member 40 and a finger 48 extending into the recess 49 in the body. A soft packing 50 in annular form extends about the member 40 which is engaged by a washer 51 which is pressed by a zig zag spring 52 always under compression between this washer 51 and the shoulder 53 to provide a seal at 55 and 56 at inner and outer diametrically opposite sides of the packing. A hole 44 in the cap serves as a vent for escape of trapped air.

The dimensions $d$ and $d^2$ will be equal so that there is no tendency for the spherical end of the rockable part to move by reason of the pressure to which it is subjected. Inasmuch as the diameter $d^3$ is less than the diameter $d^2$ fluid will enter in back of the portion 54 of the sealing member 40 and exert its pressure on the sealing member toward the right against the spherical part 25 of the rockable part. Thus the greater the pressure in the fluid being conducted the greater the pressure will be applied upon the sealing surface 42 of the member 40. Pressure so applied will be transmitted through the spherical part 25 to the sealing surface 38 and will there be applied with equal force to press these sealing faces together. Further, as the dimension $d^3$ is less than the dimension $d'$ an area represented by the differential $d^3-d^1$ will be the effective surface pressed upon by the fluid tending to force all the movable parts to the right in Figure 1 which pressure will be applied upon packing 35 proportionate to the pressure existent in the fluid system. The pressure of the washer 51 against the packing 50 spreads the packing inwardly and outwardly from the axis of the body to provide a seal which is pressed upon directly proportional to the differential of the diameters of the surface exposed to the fluid.

In this manner a control is provided for the pressure on the sealing surfaces presented to the swivelly mounted parts enabling the ball to be revolved through 360 or more degrees in either direction and also rocked in other planes until limited by engagement of the neck 26 with the edges of the opening 15.

In some cases it may be desirable to substantially duplicate the sealing construction shown at the left in Figure 1 on the opposite side of the annulus 24 to similarly seal this side against the escape of the fluid and in Fig. 2 I have shown a similar arrangement of parts on the right-hand side of the spherical part 25 to that shown on the left, there being the annular sealing member 40' movable axially with reference to the cylindrical surface 41' which is provided with a finished sealing face 42' for engagement with a spherical end of the rockable part. This member 40' is reduced in diameter as at 43' to the diameter $d^3$ about which there is received the annular soft packing 50' which is pressed against the washer 46' by the washer 51' against which presses the zig zag spring 52'. This soft packing tends to flatten out under this pressing so as to cause sealing pressure at 55' and 56' by reason of the soft packing tending under pressure to be squeezed toward the axis of the body and outwardly therefrom. A pin 33' fits into slot 57 in the member 40' to prevent relative rotation of the member 40' and the body.

The fluid pressure will act upon the sealing member 40' in a manner similar to its action upon the sealing member 40 as above explained. It will be apparent, however, that in the modified showing of Figure 2 inasmuch as the diameters of sealing surfaces of the sealing members and their reduced parts are the same that these sealing members are both pressed toward the spherical end of the rockable part of the conduit with substantially the same pressure and will substantially float in the body between the spring pressure of the zig zag springs 52 and 52' which act against the washers 51 and 51'. The seal of the soft packing 50 and 50' is thus maintained independent of any pressure exerted on the ball or sphere which differentiates in this particular respect from the action of the construction Figure 1 where the pressure on the spherical part was transmitted through the sealing member 31 to the soft packing 35.

I claim:

1. A swivel joint for a high pressure fluid system comprising a hollow body part, having a fixed conduit entrance thereinto and an exit opening therefrom, a rockable part having a spherical portion within said hollow body and a neck extending through said exit opening, a bore extending through said neck and a bore in said spherical portion communicating with said neck bore and said hollow body, annular members on either side of the bore of said spherical portion with their axes aligning with the axis of said exit opening, one being adjacent and the other distant from said opening, each having a sealing surface engaging the spherical portion of said conduit part, a soft packing between said body part and said members to provide a seal for the fluid, the member distant from said exit opening having a reduced portion at a location away from its sealing surface of less diameter than the largest diameter of its sealing surface to provide an area which receives the fluid pressure of the fluid to be sealed whereby the fluid will press upon this member forcing it toward sealing position in an amount which is a function of the differential of said diameters whereby the amount of pressure may be controlled by selection of the diameters.

2. A swivel joint for a high pressure fluid system comprising a hollow body part, having a fixed conduit entrance thereinto and an exit opening therefrom, a rockable part having a spherical portion within said hollow body and a neck extending through said exit opening, a bore extending through said neck and a bore in said spherical portion communicating with said neck bore and said hollow body, annular members on either side of the bore of said spherical portion with their axes aligning with the axis of said exit opening, one being adjacent and the other distant from said opening, each having a sealing surface engaging the spherical portion of said conduit part, a soft packing between said body part and said members to provide a seal for the fluid, the member adjacent the exit opening having an enlarged portion at a location away from its sealing surface of greater diameter than the largest diameter of the sealing surface to provide an area which receives the fluid pressure to force the member toward the exit opening, the member distant from said exit opening having a reduced portion at a location away from its sealing surface of less diameter than the largest diameter of its sealing surface to provide an area which receives the fluid pressure of the fluid to be sealed whereby the fluid will press upon this member forcing it toward sealing position and will force the spherical portion into sealing engagement with the sealing surface of the other member said pressure being in an amount which is a function of the differential of said diameters whereby the amount of pressure may be controlled by selection of the diameters.

3. A swivel joint for a high pressure fluid system comprising a hollow body part, having a fixed conduit entrance thereinto and an exit opening therefrom, a rockable part having a spherical portion within said hollow body and a neck extending through said exit opening, a bore extending through said neck and a bore in said spherical portion communicating with said neck bore and said hollow body, annular members on either side of the bore of said spherical portion with their axes aligning with the axis of said exit opening, one being adjacent and the other distant from said opening, each having a sealing surface engaging the spherical portion of said conduit part, a soft packing between said body part and said members to provide a seal for the fluid, each member having a reduced portion at a location away from its sealing surface of less diameter than the largest diameter of the sealing surface to provide an area which receives the fluid pressure of the fluid to be sealed, whereby the fluid will press upon both members forcing them toward sealing position in an amount which is a function of the differential of said diameters whereby the amount of pressure may be controlled by selection of the diameters.

4. A swivel joint for a high pressure fluid system comprising a body part into which fluid may enter and a conduit part for conducting fluid therefrom, said parts being relatively movable and sealing means between said parts comprising a pair of members each carrying a sealing surface and a surface opposite the sealing surface exposed to the pressure of the fluid the diameters of said members on said opposite surfaces being less than the diameters of the sealing surfaces to provide an area which receives fluid pressure whereby the fluid will press upon both members to urge them toward each other into sealing engagement with the relatively movable body part.

5. A swivel joint for a high pressure fluid system comprising a hollow body part, having a fixed conduit entrance thereinto and an exit opening therefrom, a rockable part having a spherical portion within said hollow body and a neck extending through said exit opening, a bore extending through said neck and a bore in said spherical portion communicating with said neck bore and said hollow body, annular seats on either side of the bore of said spherical portion, one being adjacent and the other distant from said opening, each having a sealing surface engaging the spherical portion of said conduit part, said distant seat being provided by an annular member, a soft packing between said body part and said member to provide a seal for the fluid, said member having a reduced portion at a location away from its sealing surface of less diameter than the largest diameter of the sealing surface to provide an area which receives the fluid pressure whereby the fluid will press upon this member forcing it toward sealing position in an amount which is a function of the differential of said diameters whereby the amount of pressure may be controlled by selection of the diameters.

HERBERT H. WALLEY, JR.